(12) United States Patent
Parakh et al.

(10) Patent No.: US 7,782,983 B2
(45) Date of Patent: Aug. 24, 2010

(54) METHOD AND SYSTEM FOR DEMODULATION OF A DIFFERENTIAL LORAN C SIGNAL

(75) Inventors: Rohit A. Parakh, Cape Elizabeth, ME (US); Zacahariah S. Conover, Standish, ME (US); Michael R. Leathem, Brownfield, ME (US); Kevin M. Carroll, Belmont, MA (US)

(73) Assignee: CrossRate Technology LLC, Windham, ME (US)

( * ) Notice: Subject to any disclaimer, the term of this patent is extended or adjusted under 35 U.S.C. 154(b) by 894 days.

(21) Appl. No.: 11/612,288

(22) Filed: Dec. 18, 2006

(65) Prior Publication Data

US 2008/0144744 A1    Jun. 19, 2008

(51) Int. Cl.
*H04L 27/00*    (2006.01)
(52) U.S. Cl. .................. 375/324; 375/316; 375/322
(58) Field of Classification Search ................ 375/316, 375/322, 324; 342/357.12
See application file for complete search history.

(56) References Cited

U.S. PATENT DOCUMENTS

| | | | |
|---|---|---|---|
| 3,736,590 | A | 5/1973 | Lipsey et al. |
| 5,563,611 | A | 10/1996 | McGann et al. |
| 6,707,424 | B1 | 3/2004 | Snyder et al. |
| 2004/0210385 | A1 | 10/2004 | Dale et al. |
| 2005/0177860 | A1 | 8/2005 | Goyal et al. |
| 2006/0266950 | A1 | 11/2006 | Acevedo et al. |

OTHER PUBLICATIONS

Carroll, Kevin M. et al. Differential Loran-C Presented May 2004 at the European Navigation Conference—GNSS 2004, Rotterdam, The Netherlands.*
Develooping Science & Technology List, Section 16: Positioning,Navigation and Time Technology, Depatment of Defence, Jan. 2006.*
Lo, Sherman and Enge, Per, Broadcasting Data from an SBAS Reference Network over using LORAN Presented Jun. 2000 at the Institute of Navigation's Annual Meeting, San Diego, CA.*
International Search Report and Written Opinion for corresponding PCT application, May 9, 2008, seven pages.
Screens "reelektronika", (Oct. 7, 2004), website http://www.gpsworld.com/gpsworld/product/productDetail.jsp?id=8 [more] (3 Pages).

(Continued)

*Primary Examiner*—Chieh M Fan
*Assistant Examiner*—Jaison Joseph
(74) *Attorney, Agent, or Firm*—Verrill Dana, LLP; Chris A. Caseiro

(57) ABSTRACT

A system for demodulation of the Loran Data Channel transmitted over the Enhanced Loran (eLoran) system including a quadrature filter. The quadrature filter calculates the real and quadrature phase components of a received ninth pulse. The resultant components are used to obtain the angle of the ninth pulse. This angle is then compared with a set of pre-tabulated angles/symbols that are calculated using the same quadrature filter on thirty-two different simulated ninth pulses. The closest angle match gives the corresponding symbol. Such twenty-four symbols make up a single Reed Solomon encoded message. This message is then passed through a Reed Solomon decoder and the transmitted message is obtained.

12 Claims, 7 Drawing Sheets

OTHER PUBLICATIONS

Screens "GPS Safety Net GPS—Loran Prototype Processor", (Oct. 4, 2004), website http://www.gpsworld.com/gpsworld/article/articleDetail.jsp?id=57972 (4 Pages).

Roth, G.L. et al., "Enhanced Loran and GPS/WAAS System for Aviation", (date unknown), (publication information unknown), (6 pages).

Screens "Sole Source Dead: Long Live Loran?",(Jun. 1, 2004), website http://www.aviationtoday.com/av/categories/bga/920.html (8 pages).

Pelgrum, W.J. "Miniaturizing Hybrid GPS/Loran-C/Eurofix Receivers", (Jun. 11, 2002), available at: http://www.eu-gloria.org/2002.htm (23 pages).

Roth, G.L. et al. "Integrated GPS/Loran Prototypes for Aviation Applications", (Apr. 26, 2004), website http://www.loran.org/library/2004ICNS2.pdf (22 pages).

Roth, G.L. et al. "New Integrated GPS/Loran Prototype for Aviation", (Jun. 2004), available at:http://www.loran.org/library/2004ICNS2.pdf (15 pages).

Roth, G.L. et al. "Status of Integrated GPS/Loran Prototype System for FAA Flight Trials", (date unknown), (publication information unknown), (29 pages).

(Unknown author), "The Migration to Enhanced or eLoran", (date unknown), (publication information unknown), (2 pages).

ION NTM 2004, Schedule of Oral Presentations (Abstracts no longer available via the Internet) (4 pages).

\* cited by examiner

METHOD AND SYSTEM FOR DEMODULATION OF A DIFFERENTIAL LORAN C SIGNAL

BACKGROUND OF THE INVENTION

1. Field of the Invention

This invention relates to demodulation of an analog signal. More particularly, the present invention relates to the demodulation of the Loran Data Channel (LDC).

2. Description of the Prior Art

Loran (Long Range Navigation) is a terrestrial navigation system composed of chains of low frequency radio transmitters that are used to determine position of receivers. Presently, the U.S. Coast Guard is developing the LDC, also referred to as eLoran, or enhanced Loran. The purpose of eLoran is to supplement the current Loran-C (version C) system with a differential capability that will provide information such as, absolute time, Differential Loran corrections, anomalous propagation (early skywave) warnings, and LDC system information for high-integrity applications. The addition of these capabilities will greatly increase the accuracy and utility of the Loran system. This differential capability is implemented and transmitted using 32-state Pulse Position Modulation technique on an additional Loran pulse (ninth pulse) added in every Group Repetition Interval (GRI.) Therefore, in order to utilize this capability at the receiver end, a method and related system are required to demodulate the received signal and identify the differential message transmitted over the ninth pulse. Such a demodulation would make the differential capability available for subsequent use to increase the accuracy and utility of the Loran system.

SUMMARY OF THE INVENTION

Accordingly, it is an object of this invention to obtain a differential message that is transmitted over the eLoran system.

It is another object of the invention to utilize the above mentioned demodulated and decoded message to obtain a wide variety of information including, but not limited to, Additional Secondary Factor (ASF) corrections, Coordinated Universal Time (UTC), Reference Station Identification Codes, Loran Station Identification Codes, leap seconds for UTC correction, and early skywave warnings.

The attainment of these and related objects may be achieved through use of a novel process and system for eLoran ninth pulse demodulation, as herein disclosed. An eLoran ninth pulse demodulation in accordance with this invention has an input signal, a pre-tabulated angle-symbol table, a quadrature filter to process the ninth pulse window, an angle comparator, and a Reed Solomon (RS) decoder.

In a preferred form of the eLoran ninth pulse demodulation established through the present invention, the input signal is processed by the quadrature filter for each of the symbols in a message. The resulting angles are binned and then compared to the pre-tabulated angles for each symbol to identify the symbols that are then RS decoded to obtain the message. The resulting message is used to carry out the objects of this invention.

The attainment of the foregoing and related objects, advantages and features of the invention should be more readily apparent to those skilled in the art, after review of the following more detailed description of the invention, taken together with the drawings, and the appended claims.

DETAILED DESCRIPTION OF THE PREFERRED EMBODIMENT OF THE INVENTION

Figure 1:
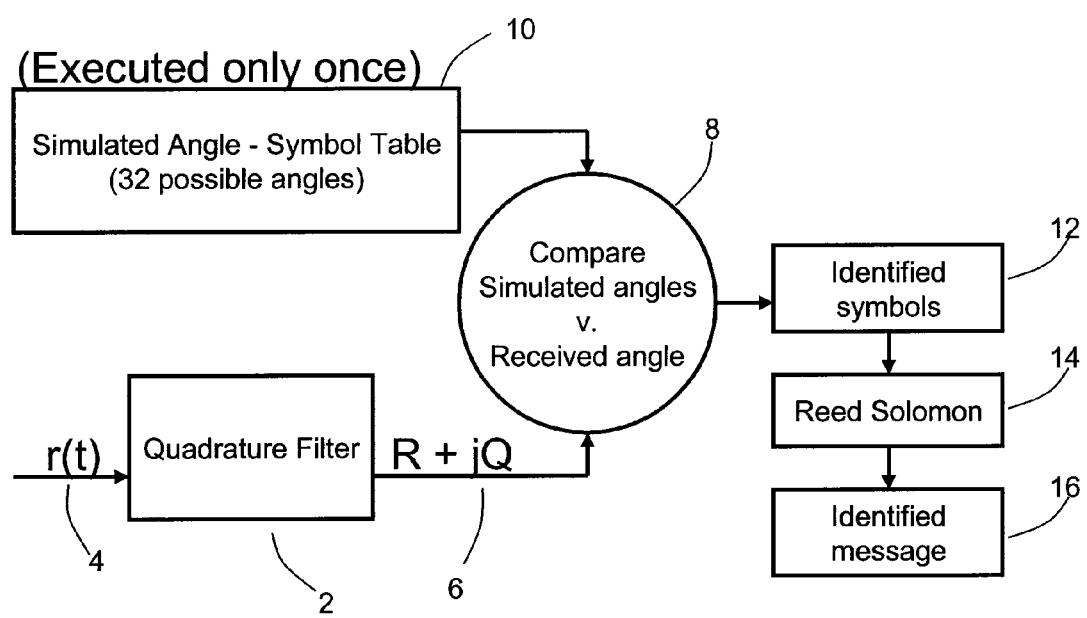
FIG. 1 shows a simplified representation of the ninth pulse demodulation.

Turning now to the drawings, more particularly to FIG. 1, there is illustrated the implementation of a demodulator of the present invention, including a quadrature filter 2 that calculates the real and quadrature phase components of the received ninth pulse 4. Reception of the input signal 4 could be accomplished using any E-field or H-field antenna to provide a plurality of pulses. The resultant components are used to obtain the angle 6 of the ninth pulse. This angle 6 is then compared at comparator 8 with a set of pre-tabulated angles/symbols 10 that are calculated using the same quadrature filter on the thirty-two different simulated ninth pulses. Each symbol corresponds to a single transmitted ninth pulse that can take one of thirty-two possible time positions, therefore, a symbol is five bits long, or equally a number between zero and thirty-one. The closest angle match gives the corresponding symbol. Such set of twenty-four symbols 12 make up a single RS encoded message. This message is then passed through a RS decoder 14 and the transmitted message 16 is obtained.

Figure 2:
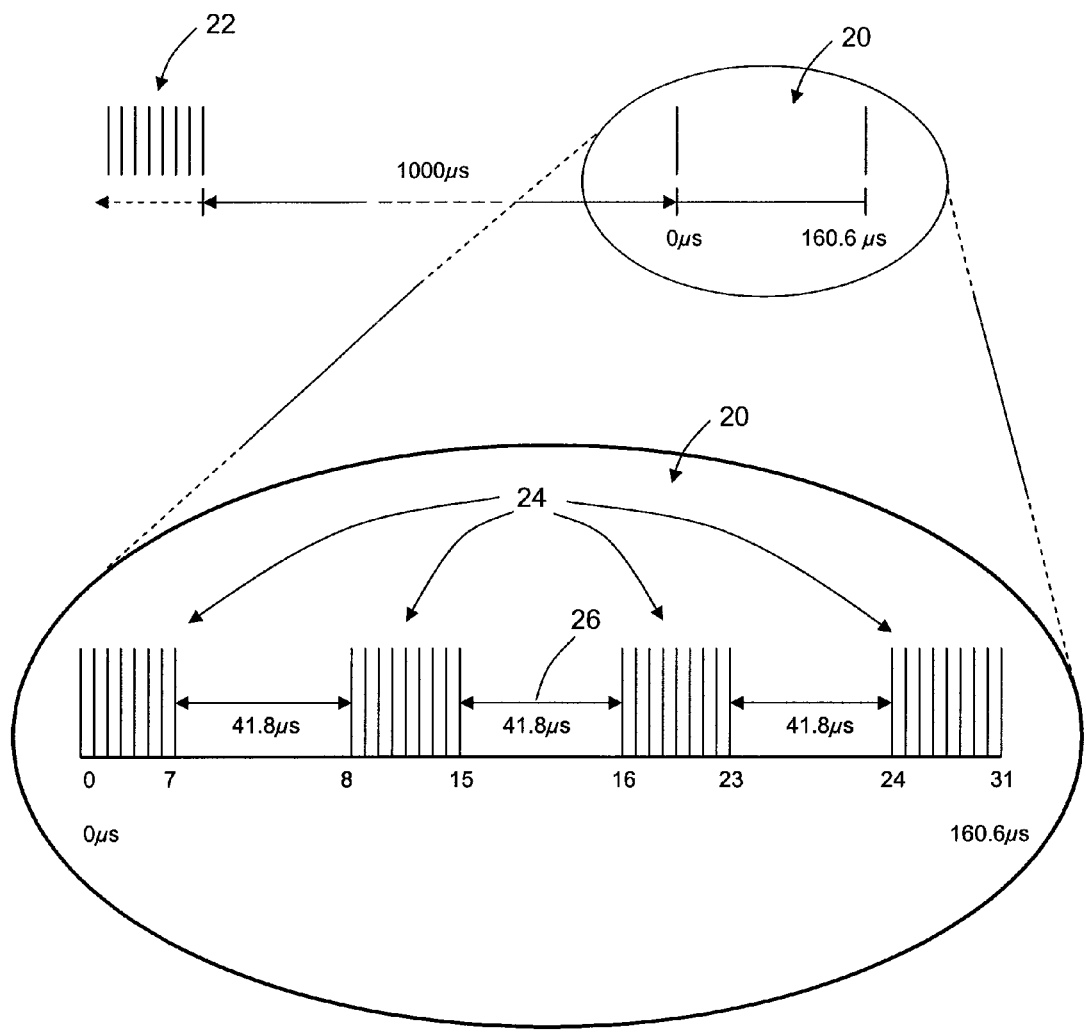
FIG. 2 shows an arrangement and timing of the ninth pulse.

Referring now to FIG. 2, there is illustrated an arrangement and timing of the ninth pulse 20. Prior to the ninth pulse are the eight pulses in a pulse group 22. Implementation of eLoran is accomplished by the addition of the ninth pulse 20 1000 μs after the beginning of the eighth pulse. The ninth pulse 20 can take one of thirty-two possible phase states 24 in each GRI in a time period of 160.6 μs. The thirty-two states are arranged in four groups 24 of eight each, with a time delay 26 of 41.8 μs between each group. Currently, the timing values are implemented and defined by U.S. Coast Guard Loran Support Unit in their Loran Data Channel Communications using $9^{th}$ Pulse Modulation, Version 1.1. The entire content of that manual is herein incorporated by reference. The present invention contemplates using these current timings and signal arrangements. In the event a newer version of the manual, or an equivalent authoritative document thereof, is introduced, the present invention contemplates the incorporation of new timings and signal arrangements in the concept of the present invention.

Figure 3:
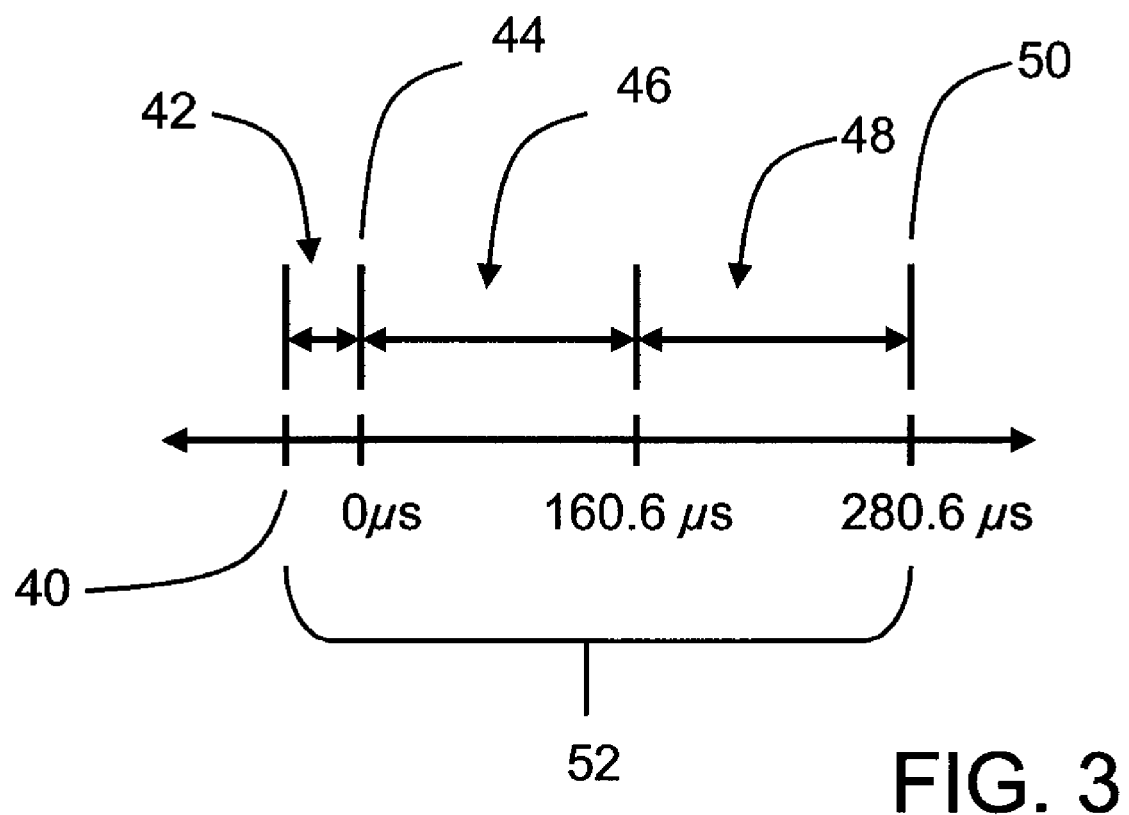
FIG. 3 illustrates the ninth pulse window.

Referring now to FIG. 3, there is illustrated a ninth pulse window comprising of three sections: 10 μs padding 42, 160.6 μs symbol occurrence time 46, and necessary length of the Loran pulse 48 (up to 500 μs). Symbol '0' at 0 μs 44 occurs exactly 1000 μs after the beginning of the eighth pulse. The start time 40 of the ninth pulse window is selected at 990 μs after the beginning of the eighth pulse. Alternatively, any of the eight pulses in the pulse group could be used to select the window start, with a timing adjustment of an additional 1000 μs for each pulse prior to eighth.

Padding 42. Because the Loran signal frequency is 100 KHz, 10 μs corresponds to 360 degrees, and as a result a 10 μs padding 42 will not change the calculated angle of the signal. Any size padding can be used; while a padding not a multiple of ten may work, the angle will be affected and must be taken into account.

Symbol time 46. The 160.6 μs symbol time 46 is included in the ninth pulse window 52 because of the possibility that this pulse could be representing any of the thirty-two symbols over the 160.6 μs range.

Length of the Loran Pulse 48. This time period is included to meet the possibility that the latter half (sixteen to thirty-one) of the thirty-two symbols is being transmitted. By including this time period, the relevant part of the pulse is captured. Because the maximum energy of a Loran pulse is concentrated in the first 65 μs, the Loran pulse period 48 is extended by 120 μs to end at 280.6 μs 50, though a larger period is possible.

Figure 4:
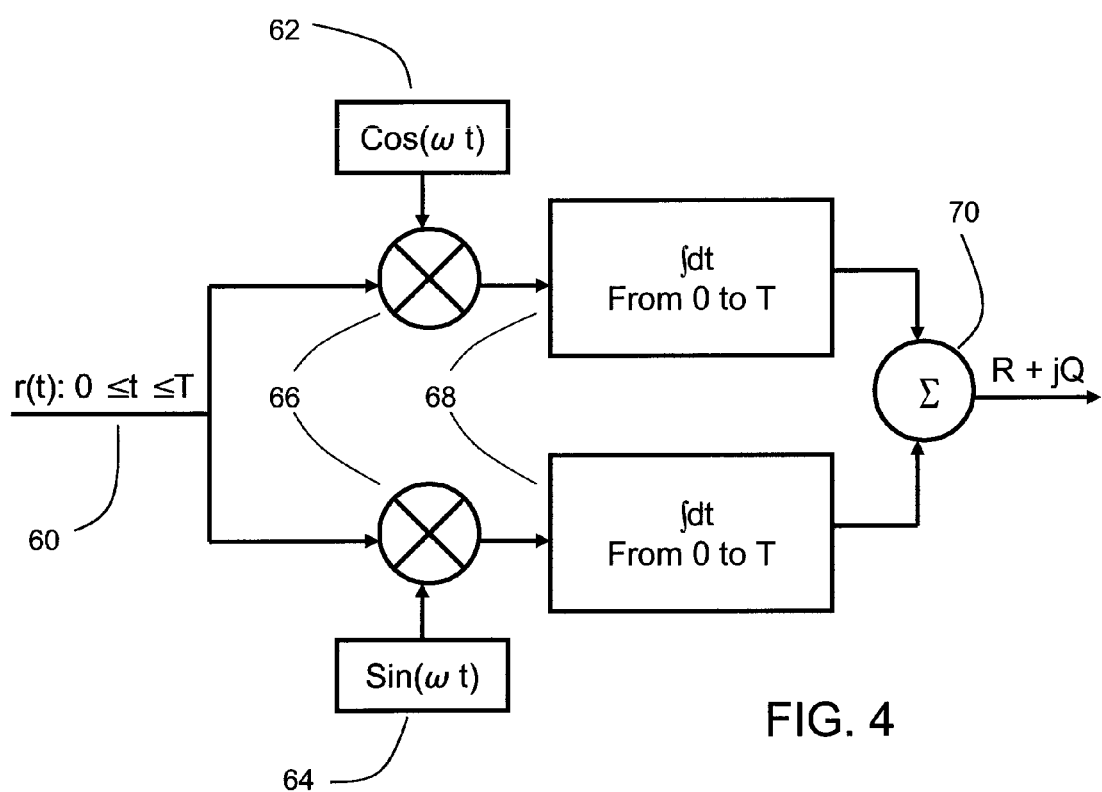
FIG. 4 illustrates the quadrature filter.

Referring now to FIG. 4, there is illustrated a preferred embodiment of the quadrature filter 2 that takes the received ninth pulse window (FIG. 3, 52) of finite time (T) and separately multiplies it at multiplier 66 by a cosine 62 and sine 64 functions, where ω equals signal frequency. The products are then integrated at integrator 68 over time (T) to obtain the signal's in-phase and out of phase components. The resulting two values are summed at summer 70 to calculate the angle/phase of the signal. This angle (in R+jQ component state) is then used for symbol identification by comparison of the resulting angle to the angles in the predefined angle-symbol table, shown as an example below, Table 1, using comparator 8 of FIG. 1.

TABLE 1

Angle-Symbol Table

| Symbol | Angle |
|---|---|
| 0 | 86 |
| 1 | 130 |
| 2 | 180 |
| 3 | 223 |
| 4 | 266 |
| 5 | 310 |
| 6 | 0 |
| 7 | 43 |
| 8 | 108 |
| 9 | 151 |
| 10 | 202 |
| 11 | 245 |
| 12 | 288 |
| 13 | 331 |
| 14 | 22 |
| 15 | 65 |
| 16 | 130 |
| 17 | 180 |
| 18 | 223 |
| 19 | 266 |
| 20 | 310 |
| 21 | 0 |
| 22 | 43 |
| 23 | 86 |
| 24 | 151 |
| 25 | 202 |
| 26 | 245 |
| 27 | 288 |
| 28 | 331 |
| 29 | 22 |
| 30 | 65 |
| 31 | 108 |

Figure 5:
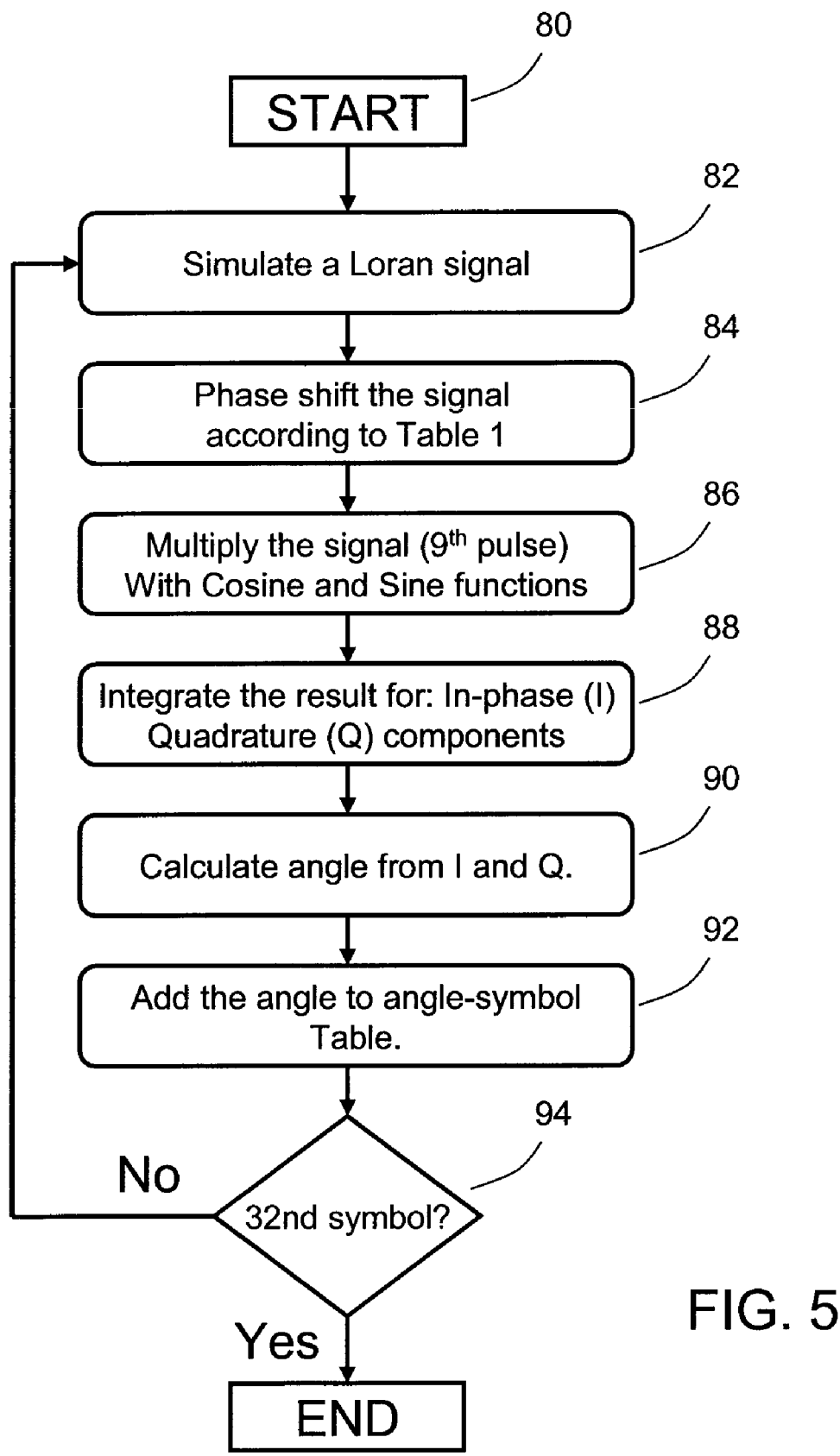
FIG. 5 shows a flow diagram for simulating the Angle-Symbol table.

Referring now to FIG. 5, there is illustrated a flow diagram for creating a Simulated Angle-Symbol Table. The method starts at START (step 80) and then flows through according to the logic of the flow diagram. The basic construct of the program sequence is a set of steps, starting at step 82, and continuing on through to the last step 92 and then loops back for all thirty-two symbols as per decision block 94. At the start, the Loran signal is simulated (step 82) for symbol zero. Subsequent iterations of the method phase shift (step 84) the simulated Loran signal for all subsequent thirty-one symbols according to Table 2 which is provided by U.S. Coast Guard Loran Support Unit in their Loran Data Channel Communications using $9^{th}$ Pulse Modulation, Version 1.1. After this proper phase shift (step 84) the signal is passed through the quadrature filter 2 as illustrated in FIG. 4, where it is multiplied (step 86) by cosine and sine functions, and then Integrated (step 88) over time to obtain the in-phase and quadrature components. Given these two components, the angle is calculated (step 90) and then included (step 92) in the angle-symbol table in correspondence to its symbol. This tabulation is executed at minimum one time and the resulting table is stored in memory for future lookup.

TABLE 2

Symbol Delays

| Symbol | Time (μs) |
|---|---|
| 0 | 0.0 |
| 1 | 1.2 |
| 2 | 2.6 |
| 3 | 3.8 |
| 4 | 5.0 |
| 5 | 6.2 |
| 6 | 7.6 |
| 7 | 8.8 |
| 8 | 50.6 |
| 9 | 51.8 |
| 10 | 53.2 |
| 11 | 54.4 |
| 12 | 55.6 |
| 13 | 56.8 |
| 14 | 58.2 |
| 15 | 59.4 |
| 16 | 101.2 |
| 17 | 102.6 |
| 18 | 103.8 |
| 19 | 105.0 |
| 20 | 106.2 |
| 21 | 107.6 |
| 22 | 108.8 |
| 23 | 110.0 |
| 24 | 151.8 |
| 25 | 153.2 |
| 26 | 154.4 |
| 27 | 155.6 |
| 28 | 156.8 |
| 29 | 158.2 |
| 30 | 159.4 |
| 31 | 160.6 |

Figure 6:
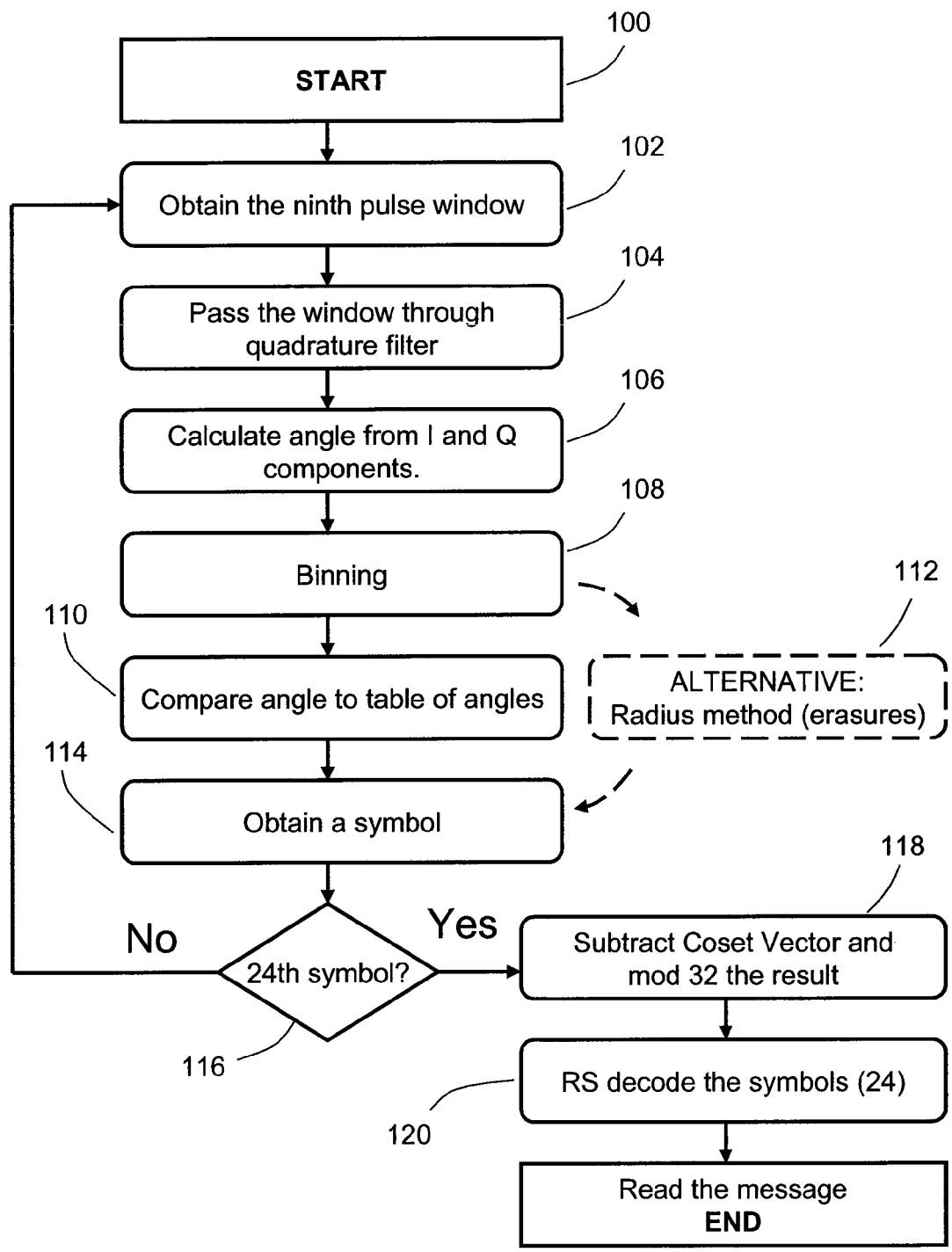
FIG. 6 shows a flow diagram of the ninth pulse demodulation.

Referring now to FIG. 6 there is illustrated the process of demodulation. The method starts at START (step 100) and then flows through according to the logic of the flow diagram. The basic design of the program sequence is a set of steps starting with first step 102 and continuing to the last step 114 as per decision block 116. This process is repeated twenty-four times because a single message to be demodulated contains twenty-four symbols. The ninth pulse window is generated (step 102) for every symbol. This received window of finite time (T) is then passed, (step 104) through a quadrature filter, and then the resulting components are used to calculate (step 106) the angle of the symbol. To simplify and expedite the comparison process, the ninth pulse time window is time binned (step 108) according to four possible groups of eight angles per bin. The resultant angle from the quadrature filter is then compared (step 110) to the eight simulated angles of Table 1 in the identified bin to identify (step 114) the symbol.

Binning (step 108) and Symbol Identification (step 114): Due to the timing arrangement of the ninth pulse (refer to Table 2) the angles of the first two groups (symbols 0-7 and 8-15) are the same as the angles of the next two groups, (symbols 16-23 and 24-31) respectively. Conceptually, the thirty-two symbols are divided into two bins: symbols 0-15, and symbols 16-31. The received ninth pulse is binned into one of these bins by comparing the timing of the maximum amplitude of the ninth pulse against the timing of the central symbol, symbol sixteen. Furthermore due to the 41.8 µs time gap 26 between every eight-symbol group, the two sixteen-symbol bins are further divided into two groups and the ninth pulse is then compared against the central eighth or twenty-fourth symbol timing, respectively. Due to binning, a computational efficiency is achieved, because instead of comparing the signal against thirty-two possible states, it is compared against only eight.

Once the relevant bin is identified, the received angle is compared by taking the difference between the eight possible angles within that bin such that the minimum difference identifies the symbol. As an example, given an angle of 25 degrees and appropriate bin to compare it to, for example, the last bin containing symbols 24 thru 31, a difference is taken between angle 25 and the angles: symbols (151:24, 202:25, 245:26, 288:27, 331:28, 22:29, 65:30, 108:31) in that bin. The minimum absolute difference of 3, out of the resulting set: 126, 177, 220, 263, 306, 3, 40, 83, corresponds to the symbol for the given angle of 25, in this example, symbol 29.

RS Message Decoding (step 120): The U.S. Loran system uses RS forward error correction (with total number of symbols, n equal to twenty-four, and number of message symbols, k equal to nine) in its transmission of the twenty-four symbol message. Identification of the first symbol in the message is required for subsequent RS decoding. This synchronization is achieved by using UTC to count up relevant GRI time units from Loran's first transmission on Jan. 1, 1958. The actual message is nine symbols long because RS encoding imparts fifteen parity symbols to the message. The message is further encoded with a coset vector (0:23) to eliminate cyclic problems, so that upon the identification of the twenty-four symbol set, the coset vector is subtracted (step 118) from the message set. The result then undergoes a mod-32 operation before passing through a (24, 9) RS Decoder (step 120). The decoded message is then converted into binary format and the forty-five bits (five bits per each of the nine symbols) are used to identify information such as, but not limited to, the station, UTC information, ASF corrections and early skywave warnings, as per Loran Data Channel Communications using Ninth Pulse Modulation manual referenced fully herein.

Figure 7:
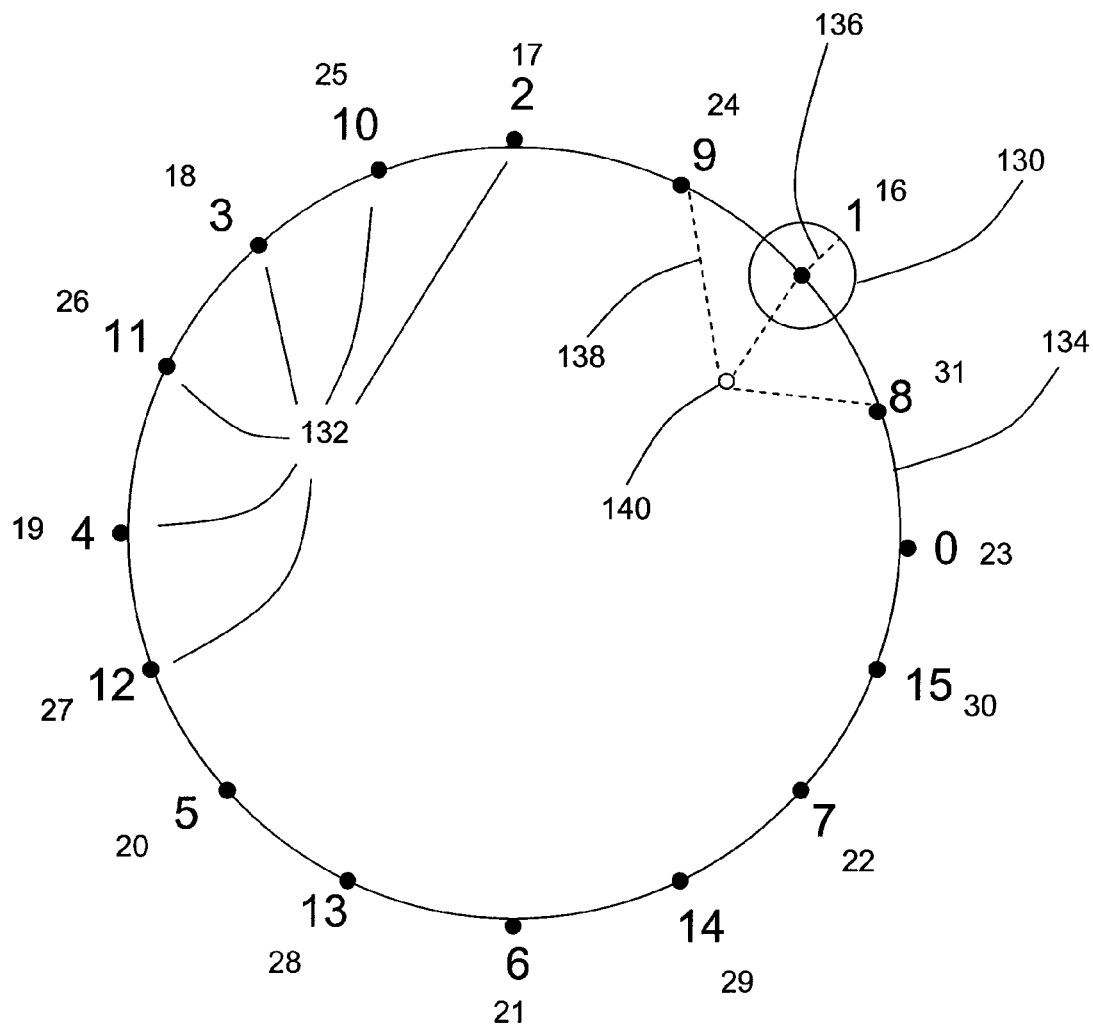
FIG. 7 shows ninth pulse symbol placement.

Referring now to FIG. 7, there is illustrated a graphical depiction of the ninth pulse symbol phase timing arrangement around a circle. In the alternative to the arithmetic comparison of angles described above, a Radius Selection Method (RSM) whereby the comparison is made against a circular area 130 around the symbols 132 could be utilized instead. This is possible because the implementation of ninth pulse symbol timing is such that the symbol groups are interleaved completely around in a circle 134 as depicted in FIG. 7.

The theoretical real and quadrature components for each symbol are calculated using the quadrature filter 2. Using these components, one-third of the straight line distance 136 between two nearest symbols (e.g. one and eight) is calculated. This distance 136 is used to determine an area 130 around the symbol. Once the real and quadrature components for the received signal 140 are calculated, the signal 140 is then time binned into one of either of the groups (0-15, 16-31) as explained above. The differences between the received signal components (I and Q) and theoretical components for each possible symbol 132 are calculated. The closest matched symbol corresponds to the minimum difference calculated. The straight line distance 138 between this received signal 140 and the theoretical closest match symbol is compared to the theoretical one-third straight line distance 136 to determine if the received symbol is an erasure; that is, it falls outside circle 130 (as is the case in FIG. 7). The benefit of properly identifying erasures, as opposed to simple arithmetic method described above, is that the subsequent RS decoding can tolerate twice as many erasures as errors.

The one-third distance 136 is selected so as to have a good compromise between the number of erasures and errors. As possible alternatives, the distance of one-half would increase the number of errors, while a distance of one-quarter would instead increase the number of erasures in lieu of errors.

It should be appreciated that the present invention of a system and corresponding method for eLoran ninth pulse demodulation can be implemented on a general purpose computer. However, it should also be appreciated that a system and corresponding method for eLoran ninth pulse demodulation can also be implemented on a special purpose computer, a programmed microprocessor or microcontroller and peripheral integrated circuit elements, an ASIC or other integrated circuit, a digital signal processor, a hardwired electronic or logic circuit such as a discreet element circuit, a programmable logic device such as a PLD, PLA, FPGA and/or PAL, or the like. In general, any device, capable of implementing a finite state machine, that is in turn capable of implementing the flow diagrams shown in FIGS. 5, 6, can be used to implement a system and corresponding method for eLoran ninth pulse demodulation.

The memory utilized in the implementation of the present invention of a system and corresponding method for eLoran ninth pulse demodulation, whether intermediately and/or continuously, can include both volatile and/or non-volatile alterable memory or non-alterable memory. Any alterable memory can be implemented using any combination of static or dynamic RAM, a hard drive and a hard disk, flash memory, a floppy disk and disk drive, a writable optical disk and disk drive, or the like. Any non-alterable memory can be implemented using any combination of ROM, PROM, EPROM, EEPROM, an optical CD-ROM disk, an optical ROM disk, such as a CD-ROM disk or a DVD-ROM disk and disk drives, or the like.

Thus, it should be understood that each of the elements of a system and steps of the corresponding method for eLoran ninth pulse demodulation can be implemented as portions of a suitably programmed general purpose computer. Alternatively, each of the elements and corresponding steps can be implemented as physically distinct hardware circuits within an ASIC, or using a FPGA, a PLD, a PLA, or a PAL, or using discreet logic elements or discreet circuit elements. The particular form each of the elements of a system and steps of the corresponding method for eLoran ninth pulse demodulation will take as a design choice will be obvious and predictable to those skilled in the art.

Moreover, the elements of a system and steps of the corresponding method for eLoran ninth pulse demodulation can be implemented as software executing on a programmed general purpose computer, a special purpose computer, a microprocessor or the like. In this case, the elements and steps of the corresponding method for eLoran ninth pulse demodulation can be implemented as routines embedded in a peripheral driver, as a resource residing on a server, or the like.

The system and corresponding method for eLoran ninth pulse demodulation can also be implemented by physically incorporating them into a software and/or hardware system.

Other variations of the above examples can be implemented. One example variation is that the process for eLoran ninth pulse demodulation to demodulate a message may include additional steps. Further, the order of the steps forming the process is not limited to the order described, as the steps may be performed in other orders, and one or more steps may be performed in series or in parallel to one or more other steps, or parts thereof. Additionally, the processes, steps thereof and various examples and variations of these processes and steps, individually or in combination, may be implemented as a computer program product tangibly as computer-readable signals on a computer-readable medium, for example, a non-volatile recording medium, an integrated circuit memory element, or a combination thereof. Such computer program product may include computer-readable signals tangibly embodied on the computer-readable medium, where such signals define instructions, for example, as part of one or more programs that, as a result of being executed by a computer, instruct the computer to perform one or more processes or acts described herein, and/or various examples, variations and combinations thereof. Such instructions may be written in any of a plurality of programming languages as previously noted.

A number of examples to help illustrate the invention have been described. Nevertheless, it will be understood that various modifications may be made without departing from the spirit and scope of the invention. Accordingly, other embodiments are within the scope of the claims appended hereto.

What is claimed is:

1. A process for eLoran ninth pulse demodulation to demodulate a message, comprising the steps of:
    receiving an input signal to be processed;
    selecting a ninth pulse time window from the input signal;
    passing the ninth pulse time window through a quadrature filter to obtain a corresponding angle;
    simulating an angle-symbol table;
    identifying a symbol by comparing the corresponding angle to the simulated angles in the angle-symbol table;
    repeating the above series of steps for a set of symbols; and
    Reed Solomon decoding the set of symbols to obtain the message.

2. The process of claim 1 wherein the ninth pulse time window selection is referenced from one of the pulses in the input signal.

3. The process of claim 1 wherein the symbol identification is performed by a Radius Selection Method.

4. The process of claim 1 wherein the ninth pulse time window period is selected to be from 65 µs to 500 µs in length.

5. The process of claim 1 further comprising the step of binning the angle-symbol table into two symbol groups: 0-15, 16-31, for each symbol identification process.

6. The process of claim 1 further comprising the step of binning the angle-symbol table into four symbol groups: 0-7, 8-15, 16-23, 24-31, for each symbol identification process.

7. An eLoran ninth pulse demodulation system, comprising:
    an input signal receiver;
    a ninth pulse time window selector to capture an appropriate ninth pulse window;
    a quadrature filter to process the ninth pulse time window and obtain a corresponding angle;
    an angle-symbol table simulator;
    a symbol identifier to compare the corresponding angle to the simulated angles in the angle-symbol table; and
    a Reed Solomon decoder to decode the set of symbols to obtain a message.

8. The eLoran ninth pulse demodulation system of claim 7 wherein said ninth pulse time window is one that is referenced from one of the pulses in the input signal.

9. The eLoran ninth pulse demodulation system of claim 7 wherein said symbol identifier utilizes a Radius Selection Method.

10. The eLoran ninth pulse demodulation system of claim 7 wherein said ninth pulse time window is 65 µs to 500 µs in length.

11. The eLoran ninth pulse demodulation system of claim 7 wherein said simulated angle-symbol table is a binned two symbol group: 0-15, 16-31.

12. The eLoran ninth pulse demodulation system of claim 7 wherein said simulated angle-symbol table is a binned four symbol group: 0-7, 8-15, 16-23, 24-31.

* * * * *